(12) United States Patent
Lin et al.

(10) Patent No.: US 11,985,508 B2
(45) Date of Patent: May 14, 2024

(54) RF FINGERPRINT SIGNAL PROCESSING DEVICE AND RF FINGERPRINT SIGNAL PROCESSING METHOD

(71) Applicant: INSTITUTE FOR INFORMATION INDUSTRY, Taipei (TW)

(72) Inventors: Ting-Yu Lin, Taipei (TW); Ping-Chun Chen, Taipei (TW); Chia-Min Lai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 610 days.

(21) Appl. No.: 17/099,796

(22) Filed: Nov. 17, 2020

(65) Prior Publication Data
US 2022/0124487 A1 Apr. 21, 2022

(30) Foreign Application Priority Data
Oct. 20, 2020 (TW) .................................. 109136300

(51) Int. Cl.
*H04W 12/79* (2021.01)
*G06N 3/08* (2023.01)
*H04B 1/16* (2006.01)
*H04W 12/108* (2021.01)

(52) U.S. Cl.
CPC ............. *H04W 12/79* (2021.01); *G06N 3/08* (2013.01); *H04B 1/16* (2013.01); *H04W 12/108* (2021.01)

(58) Field of Classification Search
CPC ...... H04W 12/79; H04W 12/108; G06N 3/08; H04B 1/16
See application file for complete search history.

(56) References Cited

U.S. PATENT DOCUMENTS 7,039,363 B1 * 5/2006 Kasapi ................. H04B 7/0854
370/347
2019/0319658 A1 * 10/2019 Calabro ................... H04B 1/04

FOREIGN PATENT DOCUMENTS

CN 108960138 B 7/2019

OTHER PUBLICATIONS

Rehman et al. "Analysis of receiver front end on the performance of RF fingerprinting", IEEE PIMRC, 2012, pp. 2494-2499.*

(Continued)

*Primary Examiner* — Li Wu Chang
(74) *Attorney, Agent, or Firm* — CKC & Partners Co., LLC

(57) ABSTRACT

An RF fingerprint signal processing device configured for executing a machine learning algorithm on a plurality of input signals. The RF fingerprint signal processing device includes a receiver-feature determination circuit and a classifying determination circuit. The receiver-feature determination circuit is configured to compute on the plurality of input signals in a neural network. The classifying determination circuit is coupled with the receiver-feature determination circuit, and the classifying determination circuit is configured to send feedback information of a receiver-feature component to the receiver-feature determination circuit. The receiver-feature determination circuit decreases the receiver-feature weight of the neural network. The receiver-feature weight is associated with the receiver-feature component, and the receiver-feature weight which is decreased is applied for computing an output value of the neural network.

8 Claims, 3 Drawing Sheets

(56) References Cited

OTHER PUBLICATIONS

Youssef et al. "Machine Learning Approach to RF Transmitter Identification", IEEE RFI, 2018, pp. 197-205.*
Riyaz et al. "Deep Learning Convolutional Neural Networks for Radio Identification", Radio Communications, 2018, pp. 146-152.*
Sankhe et al. "ORACLE: Optimized Radio clAssification through Convolutional neuraL nEtworks", 2018, p. 9, arXiv: 1812.01124v1.*
Ahirwar Kailash, "Everything you need to know about Neural Networks", Hacker Noon, originally published by Mate Labs on Nov. 1, 2017 (http://hackeroon.com/everything-you-need-to-know-about-neural-networks-8988c3ee4491).
The office action of the corresponding British application No. GB2018409.9 issued on Mar. 31, 2021.

* cited by examiner

RF FINGERPRINT SIGNAL PROCESSING DEVICE AND RF FINGERPRINT SIGNAL PROCESSING METHOD

CROSS-REFERENCE TO RELATED APPLICATION

This application claims priority to and the benefit of Taiwan Application Serial Number 109136300, filed on Oct. 20, 2020, the entire content of which is incorporated herein by reference as if fully set forth below in its entirety and for all applicable purposes.

BACKGROUND

Field of Disclosure

The disclosure generally relates to a signal processing device and a signal processing method, and more particularly, to an RF fingerprint signal processing device and an RF fingerprint signal processing method.

Description of Related Art

Developments of communication technology provide the wireless devices to send data with each other and the security level is paid more attention. Because of the convenience of wireless communication, data breaches of user's information may happen. One of the problems is that the hacker generates the camouflage device which pretends to be a normal device, and the camouflage device intercepts wireless signals in the network and sends the falsified signals. To improve the reliability of the devices, the method of recognizing the device by using the radio frequency (RF) fingerprint is a possible method. The RF fingerprint is the physical feature of the communication device, and the RF fingerprint will vary with a slight difference between the manufacturing process of each device. In this regard, the RF fingerprint can be applied for recognizing devices. Furthermore, because of the randomness and the uniqueness of the RF fingerprint, the RF fingerprint is difficult to be copied and altered, such that the reliability of the devices is improved.

When the signal is sent from the transmitter, the signal contains the RF fingerprint of the transmitter. On the other hand, when the signal is received by the receiver, the signal containing the RF fingerprint of the transmitter also contains the RF fingerprint of the receiver. That is, the RF fingerprint of the transmitter and the RF fingerprint of the receiver interference with each other, such that the recognition level decreases.

Accordingly, how to apply the RF fingerprint for improving the level of recognizing the devices is an important technical problem.

SUMMARY

The disclosure can be more fully understood by reading the following detailed description of the embodiments, with reference made to the accompanying drawings as described below. It should be noted that the features in the drawings are not necessarily to scale. The dimensions of the features may be arbitrarily increased or decreased for clarity of discussion.

The present disclosure of an embodiment provides an RF fingerprint signal processing device configured for executing a machine learning algorithm on a plurality of input signals. The RF fingerprint signal processing device includes a receiver-feature determination circuit and a classifying determination circuit. The receiver-feature determination circuit is configured to compute on the plurality of input signals in a neural network. The classifying determination circuit is coupled with the receiver-feature determination circuit, and the classifying determination circuit is configured to send feedback information of a receiver-feature component to the receiver-feature determination circuit. The receiver-feature determination circuit decreases the receiver-feature weight of the neural network. The receiver-feature weight is associated with the receiver-feature component, and the receiver-feature weight which is decreased is applied for computing an output value of the neural network.

One aspect of the present disclosure is to provide an RF fingerprint signal processing method configured for executing a machine learning algorithm on a plurality of input signals. The RF fingerprint signal processing method includes steps of: computing on the plurality of input signals in a neural network; sending feedback information of a receiver-feature component; decreasing a receiver-feature weight of the neural network, wherein the receiver-feature weight is associated with the receiver-feature component; and computing an output value of the neural network by the receiver-feature weight which is decreased.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

DETAILED DESCRIPTION

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Figure 1:
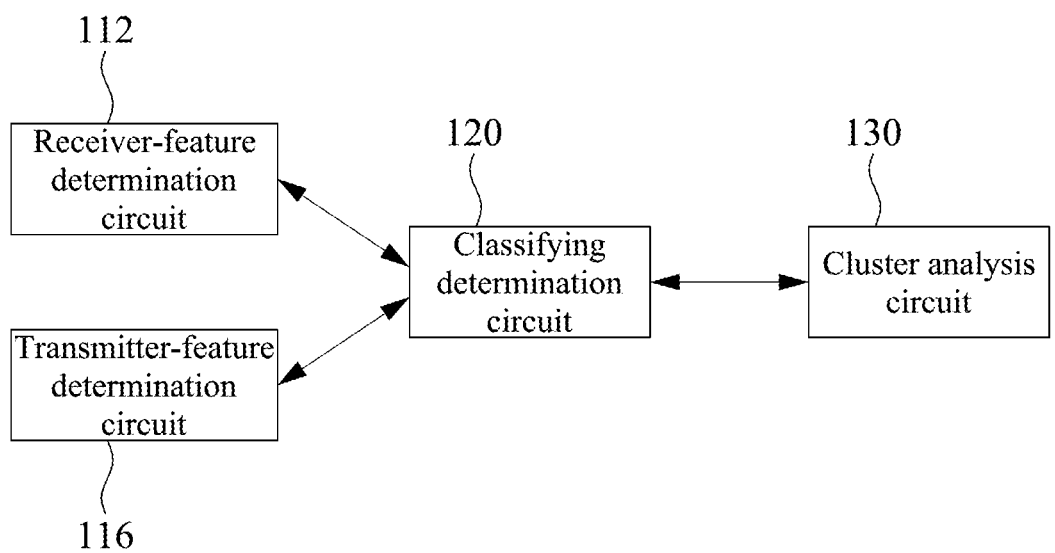
FIG. 1 is a block diagram illustrating an RF fingerprint signal processing device according to some embodiments of the present disclosure.

Reference is made to FIG. 1. FIG. 1 is a block diagram illustrating an RF fingerprint signal processing device 100 according to some embodiments of the present disclosure. The RF fingerprint signal processing device 100 is configured for executing a machine learning algorithm on a plurality of input signals. The term "input signal" is, for example, the radio frequency (RF) fingerprint signal. The fingerprint signal has a unique signal feature because of the hardware characteristics of the wireless communication device. Accordingly, the Radio Frequency Fingerprint (RFF) can be obtained by analyzing a signal feature of the RF signal. The obtained RF signal can be applied for recognizing transmitter sources and receiver sources. The RF fingerprint signal processing device 100 executes the machine learning algorithm on the plurality of input signals to train a model for recognizing correctly the transmitter/receiver from the signals.

The machine learning algorithm is executed by a neural network that has multiple layers of neurons (e.g., the deep learning algorithm), and the algorithm is not limited to the machine learning algorithm in the present disclosure. For the sake of conciseness, the multilayer perceptron (MLP) is taken as some embodiments of the disclosure.

As shown in FIG. 1, the RF fingerprint signal processing device 100 includes a receiver-feature determination circuit 112, a transmitter-feature determination circuit 116, a classifying determination circuit 120, and a cluster analysis circuit 130. The receiver-feature determination circuit 112 and the transmitter-feature determination circuit 116 are coupled with the classifying determination circuit 120. The classifying determination circuit 120 is coupled with the cluster analysis circuit 130.

In some embodiments of the multilayer perceptron, the neural network of the multilayer perceptron includes an input layer, a hidden layer, and an output layer. Multiple input data (e.g., the signal features which are acquired from the RF signals which are received) are sent to the neurons of the input layer. For the sake of brevity, the mathematical rules of each layer of neurons for the multilayer perceptron is not described herein.

In the process of executing machine learning, the computation flow of the neural network is the input layer, the hidden layer, and the output layer as one learning cycle. As practical demands, the hidden layer can be one or more layers, and the neurons of each layer have their weights and activation functions. The learning result of the output layer is the feedback data for the next learning cycle, and the weights of the neurons of each layer in the neural network can be adjusted, such that the learning result of the next cycle can be more accurate. When the learning result of the output layer is accurate more than a threshold, the learning process is finished and the model can be applied for recognizations.

Referring to FIG. 1, the receiver-feature determination circuit 112 is configured to compute on the plurality of input signals in the neural network and compute on the neurons of the next layer according to the weights and the activation functions of the neurons. Computations of the last layer of the neurons will generate a computation result. In some embodiments, the classifying determination circuit 120 sends feedback information of a receiver-feature component to the receiver-feature determination circuit 112 according to the computation result. Then, the receiver-feature determination circuit 112 adjusts receiver-feature weights of the plurality of neuron weights according to the feedback information. The receiver-feature weight is associated with the receiver-feature component, such that the classifying determination circuit 120 can correct the training result of the neural network.

In some embodiments, the weight is adjusted based on the condition that the signal is affected by the receiver, for example, the receiver-feature component of the signal. The receiver-feature determination circuit 112 will decrease the weight of the receiver-feature component in the signal after receiving the feedback information to reduce the effect ratio of the receiver signal in the neurons computation values (i.e., the value that is used for determining that the signal source is from which transmitter). Accordingly, the feature signal of the receiver is blurred and the effect for the neural network is reduced.

For example, in function (1.1) to function (1.3), $Signal_{Tx1-Rx1}$ is a feature parameter that a first transmitter sends to a first receiver (hereinafter referred to as a "first feature parameter"), $Signal_{Tx1-Rx2}$ is a feature parameter that the first transmitter sends to a second receiver (hereinafter referred to as a "second feature parameter"), and $Signal_{Tx2-Rx1}$ is a feature parameter that a second transmitter sends to the first receiver (hereinafter referred to as a "third feature parameter"). It should be noted that the terms "first transmitter", "second transmitter", "first receiver", and "second receiver" are any different antennas which are in action of transmitting or receiving. The number of the transmitters and the receivers is taken as some embodiments for describing and is not limited to the number in the disclosure. In the embodiment, each feature parameter has five components, however, the number of components is not be limited to five.

$$Signal_{Tx1-Rx1}=(1, 2, 0.3, 7, 5) \quad \text{function (1.1)}$$

$$Signal_{Tx1-Rx2}=(1, 2, 0.7, 7, 5) \quad \text{function (1.2)}$$

$$Signal_{Tx2-Rx1}=(2, 5, 9, 3, 4) \quad \text{function (1.3)}$$

In function (2), w is the weight of the feature parameter. In the neural network computation, each neuron multiplies the weight to obtain a weighted value. The weighted value is the input of the neurons of the next layer. It should be noted that the values a, b, c, d, e are natural numbers.

$$w=(a, b, c, d, e) \quad \text{function (2)}$$

Then, in function (3.1) to function (3.3), for example, after each neuron multiplies the weight by function (1.1) to function (1.3) and function (2), the weighted value of the first feature parameter is 6, the weighted value of the second feature parameter is 13, the weighted value of the third feature parameter is 13.1. In some embodiments, the classifying determination circuit 120 executes the gradient descent method to classify the weighted value. The weighted values which have similar value will be grouped into the same cluster. For example, the differences between the weighted value 6 of the first feature parameter and other weighted values of other feature parameters is larger than the differences between other weighted values except the weighted value 6. The weighted value 13 of the second feature parameter and the weighted value 13.1 of the third feature parameter is similar. Therefore, the first feature parameter is determined to be the signal of the first receiver, and the second feature parameter and the third feature parameter are determined to be the signals of the second receiver.

$$w \cdot Signal_{Tx1-Rx1}=1 \cdot a+2 \cdot b+0.3 \cdot c+7 \cdot d+5 \cdot e=6 \quad \text{function (3.1)}$$

$$w \cdot Signal_{Tx1-Rx2}=1 \cdot a+2 \cdot b+0.7 \cdot c+7 \cdot d+5 \cdot e=13 \quad \text{function (3.2)}$$

$$w \cdot Signal_{Tx2-Rx1}=2 \cdot a+5 \cdot b+9 \cdot c+3 \cdot d+4 \cdot e=13.1 \quad \text{function (3.3)}$$

Then, the classifying determination circuit 120 determines whether the classification of the transmitters is correct based on the output value. As described above, the second feature parameter is the signal of the first transmitter, however, the second feature parameter is determined to be the signal of the second transmitter by mistake. In some embodiments, when the classifying determination circuit 120 classified a first input signal of the first transmitter into a second input signal of the second transmitter by the output value, the classifying determination circuit 120 sends the feedback information of the output value which influences the receiver-feature component to the receiver-feature determination circuit 112. For example, the classifying determination circuit 120 finds the components that may influence the result among the feature parameters and reduces the weight value of the component(s) which is(are) found. In the neuron computation of the next cycle, the effect of the component(s) is reduced in the overall computation.

In some embodiments, the receiver-feature determination circuit 112 computes the output value of the neural network by the receiver-feature weight which is reduced in the neuron computation of the next cycle. The classifying determination circuit 120 classifies the plurality of input signals into the signal of the first transmitter and the signal of the second transmitter by the output value. For example, the four values of the first feature parameter are the same as the four values of the second feature parameter (e.g., the first, the second, the fourth, and the fifth components), the third component of the first feature parameter is 0.3, and the third component of the second feature parameter is 0.7. That is, the first feature parameter and the second feature parameter are the signals from the same transmitter, i.e., the first transmitter. The value of weight influences the determination of the signal, such that the signal of the first transmitter is misjudged to be the signal of the second transmitter. In the example, the third component of the second feature parameter is the key factor that has the most influence. The classifying determination circuit 120 sends the feedback information of the third component of the second feature parameter to the receiver-feature determination circuit 112. Therefore, the receiver-feature determination circuit 112 will then decrease the feature weight of the third component (e.g., the value c of the weight w is set to 0), and the feature weight of the third component which is decreased to 0 is used in the computation of the next cycle of the neural network to eliminate the influence of the third component in the overall neuron computation. The output value of the next cycle can be corrected.

Referring to FIG. 1. In some embodiments, when the classifying determination circuit 120 determines which transmitters send the plurality of input signals and the accuracy is larger than or equal to a threshold, the classifying determination circuit 120 outputs a training result of the neural network to the cluster analysis circuit 130. For example, if the classifying determination circuit 120 determines which transmitters send the plurality of input signals and the accuracy is 90% which is larger than the threshold 85%, the recognition model which can recognize the transmitter by the RF fingerprint signal is finished training and the training procedure is completed.

In some embodiments, the cluster analysis circuit 130 can recognize a receiver source of an unknown RF signal according to the recognition model which has the trained neuron weights. The neuron weights include the receiver-feature weight which is decreased.

Referring to FIG. 1. In some embodiments, the transmitter-feature determination circuit 116 increases the transmitter-feature weight of the neural network. The transmitter-feature weight is associated with the transmitter-feature component, such that the classifying determination circuit 120 can correct the output value of the neural network. The process that transmitter-feature determination circuit 116 increases the transmitter-feature weight is similar to the process that the receiver-feature determination circuit 112 decreases the receiver-feature weight described above. That is, the classifying determination circuit 120 determines whether the classified result of the transmitter is correct based on the output value, and then the component of the feature parameter which may influence the determination result is found among the feature parameter. Then the transmitter-feature determination circuit 116 increases the weight of the component for the neuron computation of the next cycle, such that the component can influence the overall computation. Therefore, the feature signal of the transmitters in the neural network is magnified, and the influence is taken more effectively.

In some embodiments, the transmitter-feature determination circuit 116 computes the output value of the neural network by the transmitter-feature weight which is increased in the neuron computation of the next cycle. The weight of the signal component which can help determine the transmitters is increased to correct the output value of the next cycle.

In some embodiments, the cluster analysis circuit 130 can recognize a receiver source of an unknown RF signal according to the recognition model which has the trained neuron weights. The neuron weights include the receiver-feature weight which is increased.

Figure 2:
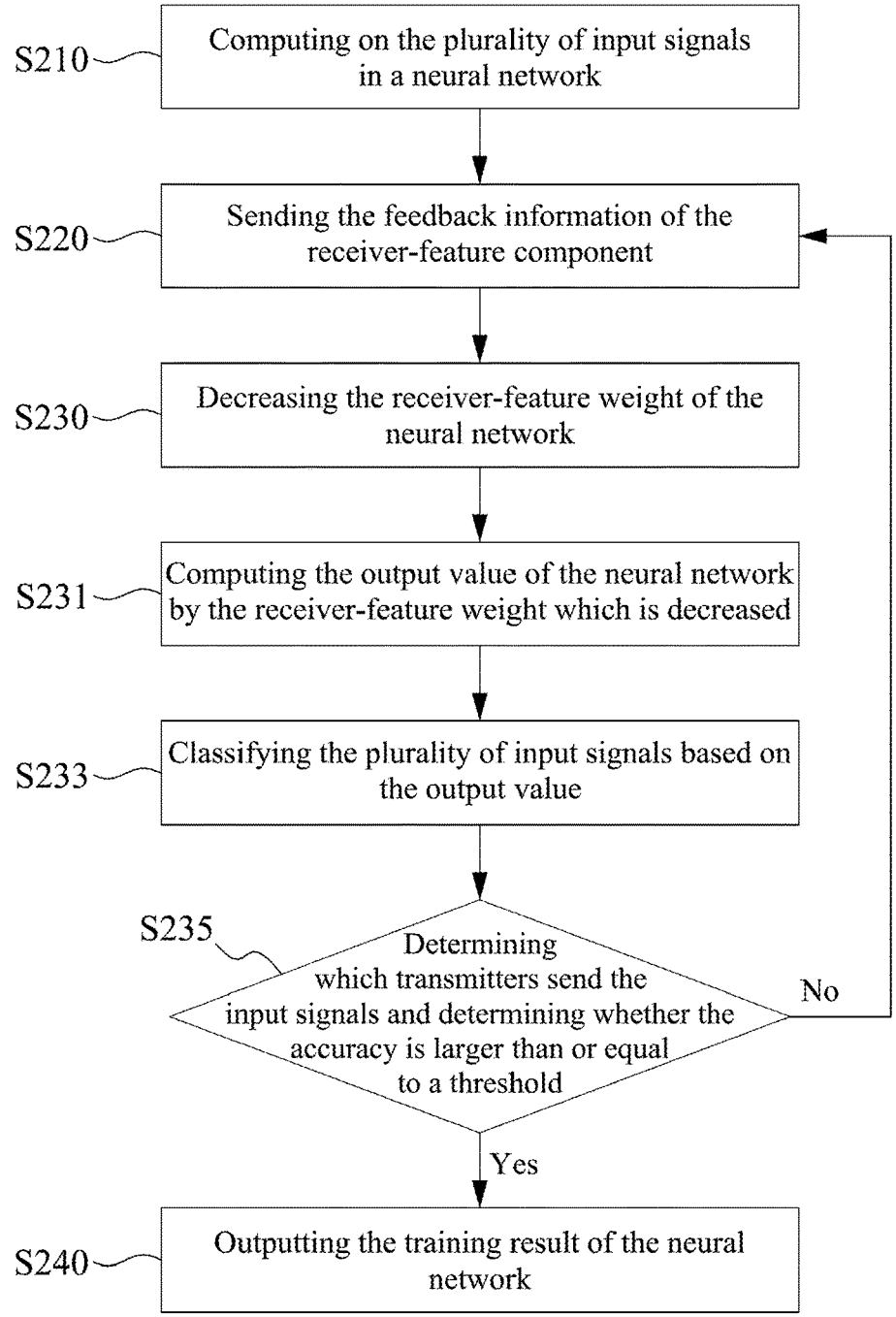
FIG. 2 is a flow chart illustrating an RF fingerprint signal processing method according to some embodiments of the present disclosure.

Reference is made to FIG. 2. FIG. 2 is a flow chart illustrating an RF fingerprint signal processing method 200 according to some embodiments of the present disclosure.

In step S210, the receiver-feature determination circuit 112 computes on the plurality of input signals in a neural network in the first cycle.

In some embodiments, the receiver-feature determination circuit 112 computes on the plurality of input signals in the neural network and computes on the neurons of the next layer according to the weights of neurons and the activation functions. After computing on the neurons, the last layer of the neurons outputs a computation result.

In step S220, the classifying determination circuit 120 sends the feedback information of the receiver-feature component to the receiver-feature determination circuit 112.

In some embodiments, the classifying determination circuit 120 analyzes the neuron values according to the computation result to obtain the feature component which influences the determination of the transmitter and sends feedback information of the receiver-feature component to the receiver-feature determination circuit 112.

In step S230, the receiver-feature determination circuit 112 decreases the receiver-feature weight of the neural network in a second cycle. The second cycle is after the first cycle.

In some embodiments, after the receiver-feature determination circuit 112 obtains the feedback information, the weight of the receiver-feature component of the signal is decreased for computing the value of the neurons in the second cycle.

In step S231, the receiver-feature determination circuit 112 computes the output value of the neural network by the receiver-feature weight which is decreased in the second cycle, such that the training result of the neural network is corrected.

In some embodiments, all computation results of the neural network are analyzed to determine which transmitters send the input signals. For example, the gradient descent method is executed to classify the computation result. The receiver-feature weight which is decreased is the corrected weight (negative enhancing the feature weight of the related receivers), such that the computation result of all the neurons in the neural network can reflect the real clusters of the transmitters.

In step S233, the classifying determination circuit 120 classifies the source of the plurality of input signals based on the output value, such that the transmitter which sends the plurality of input signals can be recognized.

In some embodiments, the classifying determination circuit 120 executes the gradient descent method to classify the computation result. The signals which belong to the same transmitter will be classified into the same group.

In step S235, the classifying determination circuit 120 determines which transmitters send the input signals and determines whether the accuracy is larger than or equal to a threshold. If the accuracy is larger than or equal to the threshold, step S240 is performed. If the accuracy is smaller than the threshold, the flow goes back to step S220.

In step S240, the classifying determination circuit 120 outputs the training result of the neural network to the cluster analysis circuit 130.

In some embodiments, the cluster analysis circuit 130 can recognize the receiver source of an unknown RF signal according to the recognition model which has the trained neuron weights.

Figure 3:
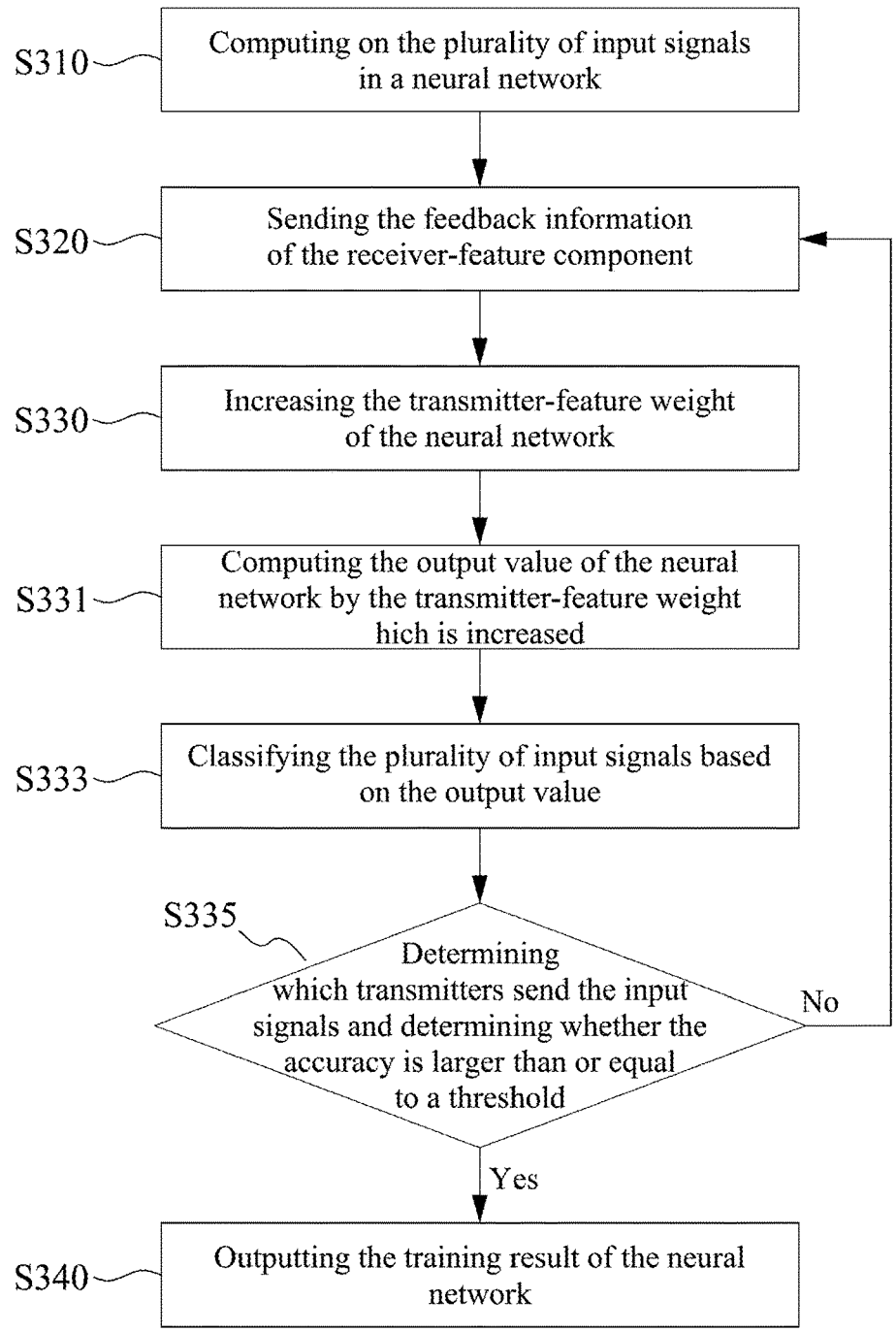
FIG. 3 is a flow chart illustrating an RF fingerprint signal processing method according to some embodiments of the present disclosure.

Reference is made to FIG. 3. FIG. 3 is a flow chart illustrating an RF fingerprint signal processing method 300 according to some embodiments of the present disclosure.

In step S310, the transmitter-feature determination circuit 116 computes on the plurality of input signals in a neural network in a first cycle.

In some embodiments, the transmitter-feature determination circuit 116 computes on the plurality of input signals in the neural network and computes on the neurons of the next layer according to the weights of neurons and the activation functions. After computing on the neurons, the last layer of the neurons outputs a computation result. The step is similar to step S210 in FIG. 2.

In step S320, the classifying determination circuit 120 sends the feedback information of the transmitter-feature component to the transmitter-feature determination circuit 116.

In some embodiments, the classifying determination circuit 120 analyzes the neuron values according to the computation result to obtain the feature component which influences the determination of the transmitter and sends feedback information of the transmitter-feature component to the transmitter-feature determination circuit 116.

In step S330, the transmitter-feature determination circuit 116 increases the transmitter-feature weight of the neural network in a second cycle. The second cycle is after the first cycle.

In some embodiments, after the transmitter-feature determination circuit 116 obtains the feedback information, the weight of the transmitter-feature component is increased for computing the value of the neurons in the second cycle.

In step S331, the transmitter-feature determination circuit 116 computes the output value of the neural network by the transmitter-feature weight which is increased in the second cycle, such that the training result of the neural network is corrected.

In some embodiments, the transmitter-feature weight which is increased is the corrected weight (positive enhancing the feature weight of the related transmitter), such that the computation result of all the neurons in the neural network can reflect the real cluster of the transmitters.

In step S333, the classifying determination circuit 120 classifies the source of the plurality of input signals based on the output value, such that the transmitter which sends the plurality of input signals can be recognized.

In some embodiments, the classifying determination circuit 120 executes the gradient descent method to classify the computation result. The signals which belong to the same transmitter will be classified into the same group.

In step S335, the classifying determination circuit 120 determines which transmitters send the input signals and determines whether the accuracy is larger than or equal to a threshold. If the accuracy is larger than or equal to the threshold, step S340 is performed. If the accuracy is smaller than the threshold, the flow goes back to step S320.

In step S340, the classifying determination circuit 120 outputs the training result of the neural network to the cluster analysis circuit 130.

In some embodiments, the cluster analysis circuit 130 can recognize the receiver source of an unknown RF signal according to the recognition model which has the trained neuron weights.

In some embodiments, the RF fingerprint signal processing device 100 also trains the recognition model for recognizing the receivers. The method for recognizing the receivers is similar to the method for recognizing the transmitters which are described above. For the sake of brevity, the method for recognizing the receivers is not described herein.

In some embodiments, the RF fingerprint signal processing device 100 can execute the RF fingerprint signal processing method 200 and 300 at the same time to train the recognition model. That is, during the time of training the model for recognizing the transmitters, the model for recognizing the receivers is trained at the same time. Furthermore, the RF fingerprint signal processing device 100 can apply the recognition model which is completed training for recognizing an unknown RF signal, such that the transmitter information and the receiver information of the unknown signal can be recognized at the same time after the signal is computed in the recognition model.

Accordingly, the accuracy for determining which transmitter sends the signals can be increased. In other words, the receiver-feature weight of the neurons can be decreased according to the feedback information of the receiver-feature component, such that the receiver signal of the plurality of input signals is negative enhanced. The effect of the receiver feature signals to the overall training result is reduced, such that the classifying determination circuit 120 ignores the feature signals of the receiver from the signals. Therefore, the effect of the feature signal of the receiver in the neural network is blurred. Furthermore, the transmitter-feature weight of the neurons is increased by the feedback information of the transmitter-feature component, such that the transmitter signal of the plurality of input signals is positively enhanced. The effect of the transmitter feature signals on the overall training result is increased, such that the feature signal of the transmitters can be recognized among the signals easily.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An RF fingerprint signal processing device configured for executing a machine learning algorithm on a plurality of input signals, wherein the RF fingerprint signal processing device comprises:
   a receiver-feature determination circuit configured to compute on the plurality of input signals in a neural network, wherein the input signals are radio frequency (RF) fingerprint signals;
   a classifying determination circuit coupled with the receiver-feature determination circuit, wherein the classifying determination circuit is configured to send feedback information of a receiver-feature component to the receiver-feature determination circuit;
   a transmitter-feature determination circuit coupled with the classifying determination circuit, wherein the transmitter-feature determination circuit is configured to increase only a transmitter-feature weight of the neural network, and the transmitter-feature weight is associated with a transmitter-feature component, the transmitter-feature determination circuit applies the transmitter-feature weight which is increased to compute an output value of the neural network; and
   a cluster analysis circuit coupled with the classifying determination circuit,
   wherein the receiver-feature determination circuit decreases only a receiver-feature weight of the neural network, the receiver-feature weight is associated with the receiver-feature component, and the receiver-feature weight which is decreased is applied for computing the output value of the neural network,
   wherein when the classifying determination circuit outputs a training result of the neural network to the cluster analysis circuit, the cluster analysis circuit is configured to recognize a receiver source and a transmitter source of an unknown RF signal according to the neural network which has trained neuron weights.

2. The RF fingerprint signal processing device of claim 1, wherein if the classifying determination circuit applies the output value to classify a feature signal of a first transmitter into a feature signal of a second transmitter, the classifying determination circuit analyzes the receiver-feature component of the output value to send feedback information of the receiver-feature component to the receiver-feature determination circuit.

3. The RF fingerprint signal processing device of claim 1, wherein if the classifying determination circuit applies the output value to classify a feature signal of a first transmitter into a feature signal of a second transmitter, the classifying determination circuit analyzes the transmitter-feature component of the output value to send feedback information of the transmitter-feature component to the receiver-feature determination circuit.

4. The RF fingerprint signal processing device of claim 1, wherein when accuracy of a determination of the transmitter source of the plurality of input signals made by the classifying determination circuit is large or equal to a threshold, the cluster analysis circuit outputs the training result of the neural network to the cluster analysis circuit.

5. An RF fingerprint signal processing method configured for executing a machine learning algorithm on a plurality of input signals, wherein the RF fingerprint signal processing method comprises:
   computing on the plurality of input signals in a neural network, wherein the plurality of input signals are radio frequency (RF) fingerprint signals;
   sending feedback information of a receiver-feature component;
   increasing only a transmitter-feature weight of the neural network, wherein the transmitter-feature weight is associated with a transmitter-feature component;
   decreasing only a receiver-feature weight of the neural network, wherein the receiver-feature weight is associated with the receiver-feature component;
   computing an output value of the neural network by the receiver-feature weight which is decreased and the transmitter-feature weight which is increased; and
   outputting a training result of the neural network, and recognizing a receiver source and a transmitter source of an unknown RF signal according to the neural network which has trained neuron weights.

6. The RF fingerprint signal processing method of claim 5, further comprising:
   analyzing the receiver-feature component of the output value if a feature signal of a first transmitter is classified into a feature signal of a second transmitter by the output value; and
   sending feedback information on the receiver-feature component.

7. The RF fingerprint signal processing method of claim 5, further comprising:
   analyzing the transmitter-feature component of the output value when classifying a feature signal of a first transmitter into a feature signal of a second transmitter by the output value; and
   sending feedback information of the transmitter-feature component.

8. The RF fingerprint signal processing method of claim 5, further comprising:
   outputting the training result of the neural network when accuracy of a determination of the transmitter source of the plurality of input signals is large or equal to a threshold.

* * * * *